US010940767B2

(12) United States Patent
Tang et al.

(10) Patent No.: US 10,940,767 B2
(45) Date of Patent: Mar. 9, 2021

(54) SELF-PROPELLED SURFACE-TRAVELING ROBOT SYSTEM AND METHOD FOR RETURNING TO PRIMARY CHARGING STATION

(71) Applicant: ECOVACS ROBOTICS CO., LTD., Suzhou (CN)

(72) Inventors: Jinju Tang, Suzhou (CN); Maoyong Chen, Suzhou (CN); Lei Zhu, Suzhou (CN); Liangliang Liao, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 270 days.

(21) Appl. No.: 15/515,506

(22) PCT Filed: Sep. 30, 2015

(86) PCT No.: PCT/CN2015/091257
§ 371 (c)(1),
(2) Date: Aug. 11, 2017

(87) PCT Pub. No.: WO2016/050215
PCT Pub. Date: Apr. 7, 2016

(65) Prior Publication Data
US 2017/0364087 A1 Dec. 21, 2017

(30) Foreign Application Priority Data
Sep. 30, 2014 (CN) .......................... 201410522039.X

(51) Int. Cl.
*B60L 53/30* (2019.01)
*G05D 1/02* (2020.01)
*G05D 1/00* (2006.01)

(52) U.S. Cl.
CPC .......... *B60L 53/305* (2019.02); *G05D 1/0088* (2013.01); *G05D 1/0225* (2013.01);
(Continued)

(58) Field of Classification Search
USPC ........................................................ 701/22
See application file for complete search history.

(56) References Cited

U.S. PATENT DOCUMENTS 5,220,263 A * 6/1993 Onishi ............. G05B 19/41895
180/168
10,520,950 B2 * 12/2019 Tang ..................... G05D 1/028
(Continued)

FOREIGN PATENT DOCUMENTS

CN        101648377 A    2/2010
CN        102545275 A    7/2012
(Continued)

OTHER PUBLICATIONS

International Search Report for related International Application No. PCT?CN2015/091257; report dated Jan. 13, 2016.
(Continued)

*Primary Examiner* — Aniss Chad
*Assistant Examiner* — Mahmoud M Kazimi
(74) *Attorney, Agent, or Firm* — Maschoff Brennan

(57) ABSTRACT

A method, applicable in a self-propelled surface-traveling robot system, for returning to a primary charging station, where the robot system comprises a surface-traveling robot and at least two charging stations for charging the robot, comprising the following steps: S1: the robot establishes a map of an area; S2: one of the charging stations is set as the primary charging station and the position of the primary charging station is recorded in the map of the area; and S3: when finishing working, the self-propelled surface-traveling robot returns to the primary charging station according to the position of the primary charging station in the map of the area. In the method, applicable in a self-propelled surface-traveling robot system, for returning to a primary charging station of the present invention, the robot returns to the position of the set primary charging station after it finishes
(Continued)

working so that the robot may be found by a user as accustomed at the position of the primary charging station when the robot is not working; and the starting point of the robot for each time working may also be determined, by setting the charging station at an important position where the robot is firstly needed to work as the primary charging station, facilitating arrangement of position for priority work.

17 Claims, 3 Drawing Sheets

(52) U.S. Cl.
CPC ......... G05D 1/0231 (2013.01); G05D 1/0274 (2013.01); *G05D 2201/0203* (2013.01)

(56) References Cited

U.S. PATENT DOCUMENTS

| | | | |
|---|---|---|---|
| 2006/0076039 A1* | 4/2006 | Song | G05D 1/0219 134/21 |
| 2011/0295420 A1* | 12/2011 | Wagner | G05D 1/0225 700/245 |
| 2016/0091899 A1* | 3/2016 | Aldred | G05D 1/0225 701/23 |
| 2017/0344014 A1* | 11/2017 | Wu | G05D 1/0242 |
| 2019/0369620 A1* | 12/2019 | Zhou | G05D 1/0212 |

FOREIGN PATENT DOCUMENTS

| | | | | |
|---|---|---|---|---|
| CN | 102738862 A | | 10/2012 | |
| CN | 103066645 A | | 4/2013 | |
| CN | 103439973 A | | 12/2013 | |
| CN | 103948354 A | | 7/2014 | |
| JP | 2679346 B2 | | 12/1991 | |
| JP | 2002318620 A | * | 10/2002 | |
| JP | 2002318620 A | | 10/2002 | |
| KR | 20090070725 A | | 7/2009 | |
| WO | WO-2015178044 A1 | * | 11/2015 | A47L 9/28 |

OTHER PUBLICATIONS

Chinese Office Action for Chinese Priority Application No. 2018071701889950, dated Jul. 20, 2018.

Chinese Office Action for Chinese Priority Application No. 201410522039.X, dated Dec. 4, 2017.

* cited by examiner

SELF-PROPELLED SURFACE-TRAVELING ROBOT SYSTEM AND METHOD FOR RETURNING TO PRIMARY CHARGING STATION

FIELD OF THE DISCLOSURE

The present invention relates to an intelligent robot, specifically to a self-propelled surface-traveling robot system and a method for returning to a primary charging cradle.

BACKGROUND OF THE DISCLOSURE

The intelligent cleaning robot comprises a floor-mopping robot, a dust-absorbing robot, an air purifier and the like, which combines the mobile robot with the cleaning technology and is currently the most challengeable hot research subject in the field of household electric appliances. Since 2000, the cleaning robot for commercial use has successively appeared and has become one new type of high-tech product in the field of service robots, showing a considerable market prospect.

Conventionally, for being adapted to large-area cleaning and multi-space cleaning, the intelligent robot is generally applied to the indoor environment and equipped with a plurality of charging cradles for charging. In the prior art, when finishing working, the robot may search for one charging cradle at random to await orders for charging such that a user cannot timely find the specific position of the robot, thereby causing the user not to timely determine the starting point of the robot for each time working and not to timely arrange the route of cleaning work for the next time, and thus decreasing the working efficiency of the robot.

SUMMARY OF THE DISCLOSURE

The technical problem of the present invention is to overcome the above deficiencies in the prior art and to provide a self-propelled surface-traveling robot system and a method for returning to a primary charging cradle, enabling the robot to timely return to the primary charging cradle after it finishes working so that, when the robot is not working, the user may find the robot at the position where the primary charging cradle is located as customary. In this case, the starting point of the robot for each time working may also be determined, and then the charging cradle at an important position where the robot is firstly needed to work may be set as the primary charging cradle, which is helpful for arrangement of position for priority work.

The technical problem of the present invention is solved by the following technical solutions:

A method, applicable in a self-propelled surface-traveling robot system, for returning to the primary charging cradle, wherein the robot system comprises a surface-traveling robot and at least two charging cradles for charging the former, comprising the following steps:

S1: the robot establishes an area map;

S2: one of the charging cradles is set as the primary charging cradle and the position of the primary charging cradle is recorded in the area map; and S3: when finishing working, the self-propelled surface-traveling robot returns to the primary charging cradle according to the position of the primary charging cradle in the area map.

In order to better set the primary charging cradle, the primary charging cradle is determined manually or automatically in S2.

Further, the step that the primary charging cradle is determined manually in S2 specifically comprises that:

the coordinates of the primary charging cradle are manually input in the area map established in S1.

Alternatively further, the step that the primary charging cradle is determined automatically in S2 specifically comprises that:

the self-propelled surface-traveling robot sets the charging cradle, which is the first one being found since the start of traveling, as the primary charging cradle, and records the position of the primary charging cradle in the established area map.

In addition, the method also comprises prior to S3:

S3': if needing charging during working, the self-propelled surface-traveling robot searches for the charging cradle closest to the body of the self-propelled surface-traveling robot, or the primary charging cradle for charging.

Further, in S3', the self-propelled surface-traveling robot searches for the charging cradle closest to the body of the self-propelled surface-traveling robot for charging by means of a distance measuring device of the surface-traveling robot.

Alternatively further, in S3', the self-propelled surface-traveling robot determines whether the distance between the primary charging cradle and the body of the self-propelled surface-traveling robot is within a preset range by means of a distance measuring device of the surface-traveling robot, and if yes, the self-propelled surface-traveling robot searches for the primary charging cradle for charging; otherwise the self-propelled surface-traveling robot searches for the charging cradle closest to the body of the self-propelled surface-traveling robot for charging.

In order to better establish the area map, the area map is established through the distance data obtained by a laser distance measuring device in S1.

The present invention also provides a self-propelled surface-traveling robot system comprising: a self-propelled surface-traveling robot and at least two charging cradles for charging the former, wherein the self-propelled surface-traveling robot comprises a distance measuring device, a traveling unit, a drive unit, a functional component, a control unit and a memory unit; the control unit is connected to the distance measuring device, the memory unit and the drive unit, respectively; the drive unit is connected to the traveling unit so as to drive the traveling unit to travel; the control unit establishes an area map after processing the distance data acquired by the distance measuring device and stores the area map in the memory unit; and wherein the self-propelled surface-traveling robot adopts the method for returning to the primary charging cradle as mentioned above.

Preferably, the functional component is a sweeping component, a waxing component, a security alarm component, an air purifying component, and/or a polishing component.

Further, the self-propelled surface-traveling robot system further comprises a user client for receiving the map data transmitted from the robot.

The user client is provided with an interactive interface by which the user manually inputs the coordinates of the primary charging cradle in the area map.

The advantageous effects of the present invention are as follows. The robot returns to the position of the set primary charging cradle after it finishes working so that, when the robot is not working, the user may find the robot at the position where the primary charging cradle is located as customary. In addition, the starting point of the robot for each time working may also be determined, and then the charging cradle at an important position where the robot is firstly needed to work may be set as the primary charging cradle, which is helpful for arrangement of position for priority work; or the charging cradle at an position where the needed cleaning frequency is highest may be set as the primary charging cradle, thereby improving the use efficiency of the robot.

Hereinafter, the technical solutions of the present invention will be described in detail in combination with attached drawings and specific embodiments.

DESCRIPTION OF ATTACHED DRAWINGS

DETAILED DESCRIPTION OF THE DISCLOSURE

The First Embodiment

Figure 1:
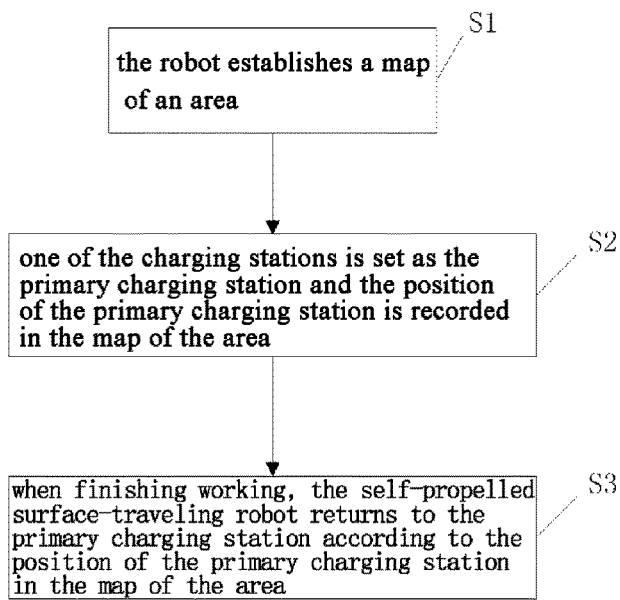
FIG. 1 is a flowchart of steps of a method for returning the self-propelled surface-traveling robot to the primary charging cradle according to the present invention.
Figure 2:
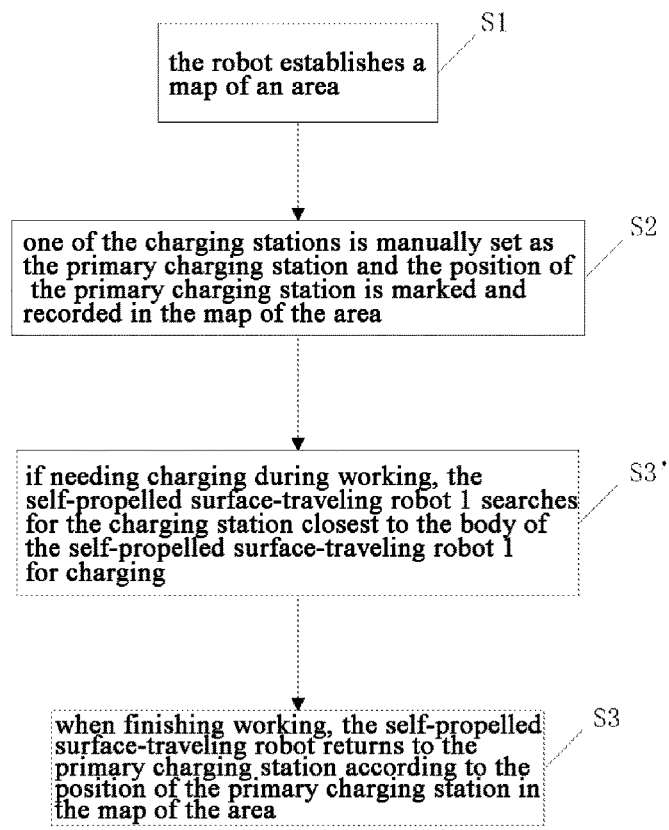
FIG. 2 is a flowchart of steps of a method for returning the self-propelled surface-traveling robot to the primary charging cradle according to the first embodiment of the present invention.
Figure 4:
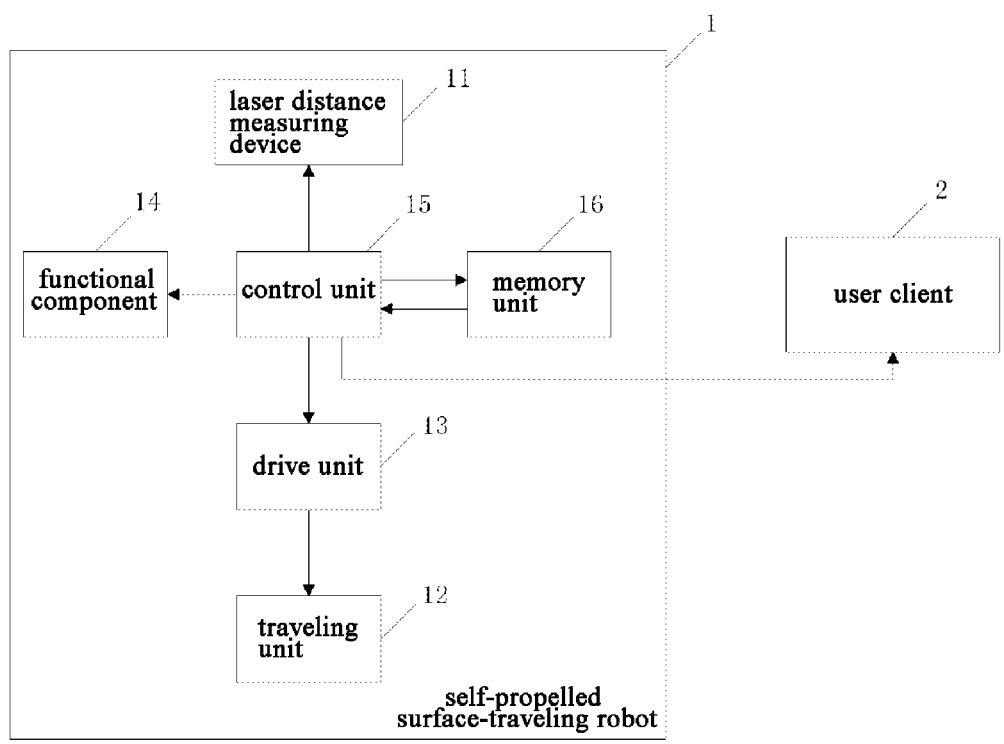
FIG. 4 is a block diagram of the self-propelled surface-traveling robot system according to the present invention.

FIG. 1 is a flowchart of steps of a method for returning the self-propelled surface-traveling robot to the primary charging cradle according to the present invention, FIG. 2 is a flowchart of steps of the method for returning the self-propelled surface-traveling robot to the primary charging cradle according to the first embodiment of the present invention, and FIG. 4 is a block diagram of the self-propelled surface-traveling robot system according to the present invention. As shown in FIG. 2 and with reference to FIGS. 1 and 4, this embodiment provides a method, applicable in the self-propelled surface-traveling robot system, for returning to the primary charging cradle.

S1: the robot establishes an area map. The self-propelled surface-traveling robot 1 has a distance measuring device provided thereon, and establishes the area map through the distance data obtained by the distance measuring device. Specifically, a 360° scanning is performed on the plane of the area by laser light so as to acquire the data of the distances between each of the objects scanned by the laser light within 360° and the self-propelled surface-traveling robot 1, and thus to establish the area map. In this embodiment, in order to better verify and assist the established area map, the self-propelled surface-traveling robot 1 assists and verifies the established area map by means of converting the revolutions of a traveling unit 12 such as a driving wheel during working into the distance.

S2: one of the charging cradles is set as the primary charging cradle and the position of the primary charging cradle is recorded in the area map. In this step, a user manually inputs the coordinates of the primary charging cradle in the area map established in S1 through an interactive interface on an user client 2 (such as a touch screen on a phone or an ipad) connected to the self-propelled surface-traveling robot 1, and then transmits the coordinates of the primary charging cradle to the self-propelled surface-traveling robot 1 through the user client 2. For example, the user may set the charging cradle in the master bedroom or the sitting room as the primary charging cradle, and the specific reasons are as follows: on the one hand, the user spends most of his/her time in the master bedroom or the sitting room, i.e., the master bedroom or the sitting room is considered as the main living space or the important position where the robot is firstly needed to work; and on the other hand, the user can find the self-propelled surface-traveling robot in the master bedroom or the sitting room, which is helpful for subsequent control of the self-propelled surface-traveling robot for work.

S3': if needing charging during working, the self-propelled surface-traveling robot 1 searches for the charging cradle closest to the body of the self-propelled surface-traveling robot for charging by means of the distance measuring device. Note that, herein, if the self-propelled surface-traveling robot 1 finds two closest charging cradles at one time, a control unit 15 firstly determines which one of the routes to the two charging cradles is easier for the self-propelled surface-traveling robot 1 to travel along, and the specific factor for determination comprises the number of obstacles in the traveling routes. If it is determined that the routes to the two charging cradles are equally difficult for the self-propelled surface-traveling robot 1 to travel along, the self-propelled surface-traveling robot 1 travels along the default route (for example, turning left or turning right by default).

S3: when finishing working, the self-propelled surface-traveling robot returns to the primary charging cradle according to the position of the primary charging cradle in the area map.

The Second Embodiment

Figure 3:
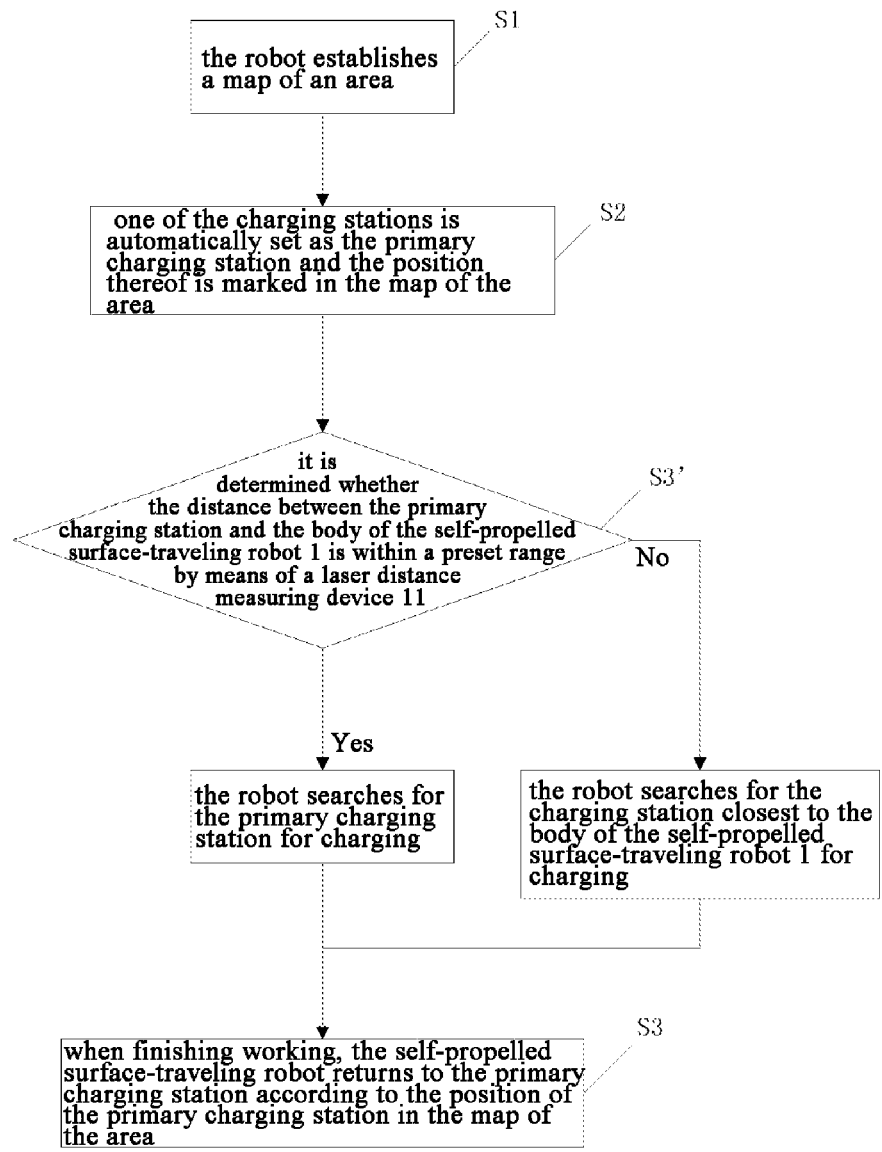
FIG. 3 is a flowchart of steps of the method for returning the self-propelled surface-traveling robot to the primary charging cradle according to the second embodiment of the present invention.

FIG. 3 is a flowchart of steps of the method for returning the self-propelled surface-traveling robot to the primary charging cradle according to the second embodiment of the present invention. As shown in FIG. 3 and with reference to FIGS. 1 and 4, the method for returning the self-propelled surface-traveling robot 1 to the primary charging cradle according to this embodiment is substantially similar to that according to the first embodiment, and it is different from the method according to the first embodiment in that: in S2, the self-propelled surface-traveling robot automatically determines the primary charging cradle, for example, setting the charging cradle, which is the first one being found since the start of traveling, as the primary charging cradle, and recording the position of the primary charging cradle in the area map established in S1. Alternatively, the robot automatically sets the charging cradle in the largest room (generally corresponding to the bedroom) in the area map as the primary charging cradle. Note that, the charging cradle can be recognized by various means in the present invention. For example, the body of the charging cradle may emit an infrared signal so that, when the robot travels to a position within the scope of the infrared signal emitted from the charging cradle, the robot sets the charging cradle as the primary charging cradle after receiving the infrared signal emitted from this charging cradle, and determines the position of the charging cradle according to the distance from the charging cradle. Also for example, the charging cradle is provided with a label (for example, a light reflecting material) so that, when the robot finds the label, the robot will recognize the charging cradle and record the position of the charging cradle. In S3', if the self-propelled surface-traveling robot 1 needs charging during working, it is determined whether the distance between the primary charging cradle and the body of the self-propelled surface-traveling robot 1 is within a preset range by means of a distance measuring device 11, and if yes, the self-propelled surface-traveling robot 1 searches for the primary charging cradle for charging; otherwise the self-propelled surface-traveling robot searches for the charging cradle closest to the body of the self-propelled surface-traveling robot 1 for charging.

The present invention also provides a self-propelled surface-traveling robot system comprising: a self-propelled surface-traveling robot 1 and at least two charging cradles for charging the former. When needing to manually set the primary charging cradle, the robot system further comprises a user client 2. The self-propelled surface-traveling robot 1 comprises a distance measuring device 11, a traveling unit 12, a drive unit 13, a functional component 14, a control unit 15 and a memory unit 16. The control unit 15 is connected to the distance measuring device 11, the memory unit 16 and the drive unit 13, respectively. The drive unit 13 is connected to the traveling unit 12 and receives the instructions from the control unit 15 so as to drive the traveling unit 12 to travel. The control unit 15 establishes an area map after processing the distance data acquired by the distance measuring device 11 and stores the area map in the memory unit 16, wherein the distance measuring device may employ a camera module, a coded disc, a laser scanning rangefinder etc. The functional component 14 may employ a sweeping component, a waxing component, a security alarm component, an air purifying component, and/or a polishing component.

The user client 2 receives the map data transmitted from the self-propelled surface-traveling robot, and comprises an interactive interface by which the user manually inputs the coordinates of the primary charging cradle in the established area map. The self-propelled surface-traveling robot 1 adopts the method for returning to the primary charging cradle according to the above-mentioned embodiments.

From the above two embodiments, the robot returns to the position of the set primary charging cradle after it finishes working in the present invention so that, when the robot is not working, the user may find the robot at the position where the primary charging cradle is located as customary. In addition, the starting point of the robot for each time working may also be determined, and then the charging cradle at an important position where the robot is firstly needed to work may be set as the primary charging cradle, which is helpful for arrangement of position for priority work; or the charging cradle at an position where the needed cleaning frequency is highest may be set as the primary charging cradle, thereby improving the use efficiency of the robot.

The invention claimed is:

1. A method, applicable in a self-propelled surface-traveling robot system, for returning to a primary charging station, wherein the robot system comprises a surface-traveling robot traveling in an area and at least two charging stations in the area for charging the robot, and the method comprises:
the robot establishing a map of the area;
setting one charging station in the area from the at least two charging stations as the primary charging station and recording the position of the primary charging station in the map of the area; and
when finishing working, the self-propelled surface-traveling robot returning to the primary charging station according to the position of the primary charging station in the map of the area;
wherein the setting one charging station in the area from the at least two charging stations as the primary charging station and recording the position of the primary charging station in the map of the area comprises:
setting a charging station at an important position, where the self-propelled surface-traveling robot is firstly needed to work, as the primary charging station.

2. The method for returning to the primary charging station of claim 1, wherein the primary charging station is set manually or automatically.

3. The method for returning to the primary charging station of claim 2, wherein manually setting the primary charging station comprises:
the coordinates of the primary charging station are manually input in the map of the area.

4. The method for returning to the primary charging station of claim 1, wherein automatically setting the primary charging station comprises:
the self-propelled surface-traveling robot sets the charging station, which is the first one being found since the start of traveling, as the primary charging station, and records the position of the primary charging station in the established map of the area.

5. The method for returning to the primary charging station of claim 1, wherein prior to the self-propelled surface-traveling robot returning to the primary charging station when finishing working comprises:
if needing charging during working, the self-propelled surface-traveling robot searches for the charging station closest to the body of the self-propelled surface-traveling robot, or the primary charging station for charging.

6. The method for returning to the primary charging station of claim 5, wherein the self-propelled surface-traveling robot searches for the charging station closest to the body of the self-propelled surface-traveling robot for charging by means of a distance measuring device of the surface-traveling robot.

7. The method for returning to the primary charging station of claim 5, wherein the self-propelled surface-traveling robot determines whether the distance between the primary charging station and the body of the self-propelled surface-traveling robot is within a preset range by means of a distance measuring device of the surface-traveling robot, and if yes, the self-propelled surface-traveling robot searches for the primary charging station for charging; otherwise the self-propelled surface-traveling robot searches for the charging station closest to the body of the self-propelled surface-traveling robot for charging.

8. The method for returning to the primary charging station of claim 1, wherein the map of the area is established through the distance data obtained by a laser distance measuring device.

9. The method for returning to the primary charging station of claim 1, wherein the setting one charging station in the area from the at least two charging stations as the primary charging station and recording the position of the primary charging station in the map of the area comprises:
setting one charging station in the area from the at least two charging stations as the primary charging station according to an operation attribute of the position where the charging station is located.

10. A method, applicable in a self-propelled surface-traveling robot system, for returning to a primary charging station, wherein the robot system comprises a surface-traveling robot traveling in an area and at least two charging stations in the area for charging the robot, and the method comprises:

the robot establishing a map of the area;

setting one charging station in the area from the at least two charging stations as the primary charging station and recording the position of the primary charging station in the map of the area; and when finishing working, the self-propelled surface-traveling robot returning to the primary charging station according to the position of the primary charging station in the map of the area;

wherein the setting one charging station in the area from the at least two charging stations as the primary charging station and recording the position of the primary charging station in the map of the area comprises:

setting a charging station at a position where the needed cleaning frequency is highest, as the primary charging station.

11. The method for returning to the primary charging station of claim 10, wherein the primary charging station is set manually or automatically.

12. The method for returning to the primary charging station of claim 11, wherein manually setting the primary charging station comprises:

the coordinates of the primary charging station are manually input in the map of the area.

13. The method for returning to the primary charging station of claim 10, wherein automatically setting the primary charging station comprises:

the self-propelled surface-traveling robot sets the charging station, which is the first one being found since the start of traveling, as the primary charging station, and records the position of the primary charging station in the established map of the area.

14. The method for returning to the primary charging station of claim 10, wherein prior to the self-propelled surface-traveling robot returning to the primary charging station when finishing working comprises:

if needing charging during working, the self-propelled surface-traveling robot searches for the charging station closest to the body of the self-propelled surface-traveling robot, or the primary charging station for charging.

15. The method for returning to the primary charging station of claim 14, wherein the self-propelled surface-traveling robot searches for the charging station closest to the body of the self-propelled surface-traveling robot for charging by means of a distance measuring device of the surface-traveling robot.

16. The method for returning to the primary charging station of claim 14, wherein the self-propelled surface-traveling robot determines whether the distance between the primary charging station and the body of the self-propelled surface-traveling robot is within a preset range by means of a distance measuring device of the surface-traveling robot, and if yes, the self-propelled surface-traveling robot searches for the primary charging station for charging; otherwise the self-propelled surface-traveling robot searches for the charging station closest to the body of the self-propelled surface-traveling robot for charging.

17. The method for returning to the primary charging station of claim 10, wherein the map of the area is established through the distance data obtained by a laser distance measuring device.

* * * * *